US011379815B2

(12) United States Patent
Widmann et al.

(10) Patent No.: US 11,379,815 B2
(45) Date of Patent: Jul. 5, 2022

(54) SYSTEM FOR SECURE PEER-TO-PEER INTERACTIONS WITH EVENT-BASED CONFIRMATION TRIGGERING MECHANISM

(71) Applicant: BANK OF AMERICA CORPORATION, Charlotte, NC (US)

(72) Inventors: Craig D. Widmann, Chandler, AZ (US); Eren Kursun, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 66 days.

(21) Appl. No.: 16/595,012

(22) Filed: Oct. 7, 2019

(65) Prior Publication Data
US 2021/0103909 A1 Apr. 8, 2021

(51) Int. Cl.
*G06Q 20/22* (2012.01)
*G06Q 20/02* (2012.01)
*G06F 16/23* (2019.01)

(52) U.S. Cl.
CPC ....... *G06Q 20/223* (2013.01); *G06F 16/2379* (2019.01); *G06Q 20/02* (2013.01)

(58) Field of Classification Search
CPC ... G06Q 20/223; G06Q 20/02; G06F 16/2379
See application file for complete search history.

(56) References Cited

U.S. PATENT DOCUMENTS

| | | | |
|---|---|---|---|
| 7,587,342 B2 | 9/2009 | Neofytides et al. | |
| 7,801,828 B2 | 9/2010 | Candella et al. | |
| 9,633,348 B2 | 4/2017 | Rolf | |
| 9,940,608 B2 | 4/2018 | Kapur | |
| 2007/0233615 A1 | 10/2007 | Tumminaro | |
| 2012/0310782 A1* | 12/2012 | Konakanchi | G06Q 20/12 705/26.81 |

(Continued)

OTHER PUBLICATIONS

Levi, Stuart D; Alex Lipton. "An Introduction to Smart Contracts and Their Potential and Inherent Limitations," Harvard Law School Forum on Corporate Governance, (May 26, 2018). (Year: 2018).*

(Continued)

*Primary Examiner* — Elizabeth H Rosen
(74) *Attorney, Agent, or Firm* — Moore & Van Allen PLLC; R. W. McCord Rayburn

(57) ABSTRACT

A system for event-based peer-to-peer resource transfers. The system comprising: a controller configured for tracking and confirming resource transfers, the controller being further configured to: generate a resource transfer for transferring a resource from a first user device to a second user device, wherein the resource transfer comprises a conditional event for triggering a transfer of the resource, and wherein the conditional event is accepted by the first user device and the second user device; receive the resource from the first user device, wherein the resource is held separate from the first user device and the second user device; determine that the conditional event has been executed by at least one of the first user device and the second user device; and based on the determining that the conditional event has been executed, trigger the transfer of the resource to the second user device.

20 Claims, 6 Drawing Sheets

(56) References Cited

U.S. PATENT DOCUMENTS

| | | | |
|---|---|---|---|
| 2013/0060679 A1 | 3/2013 | Oskolkov et al. | |
| 2014/0310171 A1 | 10/2014 | Grossman et al. | |
| 2014/0310172 A1 | 10/2014 | Grossman et al. | |
| 2017/0364895 A1 | 12/2017 | Van Heerden et al. | |
| 2018/0121975 A1 | 5/2018 | Weinflash et al. | |
| 2018/0197167 A1 | 7/2018 | Ganesan | |
| 2018/0232693 A1* | 8/2018 | Gillen | G06Q 10/0834 |
| 2018/0336542 A1 | 11/2018 | Wilson et al. | |
| 2019/0013948 A1* | 1/2019 | Mercuri | G06F 9/451 |
| 2019/0043052 A1 | 2/2019 | Ledford et al. | |
| 2019/0122258 A1 | 4/2019 | Bramberger et al. | |
| 2019/0229926 A1* | 7/2019 | Handa | G06Q 20/223 |
| 2020/0184557 A1* | 6/2020 | Wang | H04L 9/3218 |
| 2020/0311670 A1* | 10/2020 | Sankaran | H04L 9/3239 |
| 2021/0219102 A1* | 7/2021 | Gion | G06Q 20/065 |

OTHER PUBLICATIONS

Mearian, Lucas. "What's a Smart Contract (and How does it Work)?" Computerworld (Jul. 29, 2019). (Year: 2019).*

* cited by examiner

# SYSTEM FOR SECURE PEER-TO-PEER INTERACTIONS WITH EVENT-BASED CONFIRMATION TRIGGERING MECHANISM

BACKGROUND

Resource transfers, such as peer-to-peer resource transfers, have grown in popularity in recent years. Due to the ease, speed, and finality of the interactions involved, peer-to-peer resource transfers are subject to misappropriation attempts. As such, there exists a need for an improved resource transfer system for generating and executing customizable resource transfers with event-based tracking for improved resource transfer security and confirmation.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system for event-based peer-to-peer resource transfers is disclosed. The system comprises: a controller configured for tracking and confirming resource transfers, the controller comprising a memory device with computer-readable program code stored thereon, a communication device connected to a network, and a processing device, wherein the processing device is configured to execute the computer-readable program code to: generate a resource transfer for transferring a resource from a first user device to a second user device, wherein the resource transfer comprises a conditional event for triggering a transfer of the resource, and wherein the conditional event is accepted by the first user device and the second user device; receive the resource from the first user device, wherein the resource is held separate from the first user device and the second user device; determine that the conditional event has been executed by at least one of the first user device and the second user device; and based on the determining that the conditional event has been executed, trigger the transfer of the resource to the second user device.

In one embodiment, the resource is held separate from the first user device and the second user device by a third user device. In another embodiment, triggering the transfer comprises releasing the resource to the second user device.

In yet another embodiment, generating the resource transfer further comprises determining a period of time in which the conditional event must be executed to trigger the transfer of the resource. In yet another embodiment, the processing device is further configured to execute the computer-readable program code to: determine that the conditional event has not been executed within the period of time; and based on determining that the conditional even has not been executed within the period of time, releases the resource back to the first user device.

In yet another embodiment, the resource is a first resource, and the resource transfer further comprises transferring a second resource from the second user device to the first user device in exchange for the first resource, wherein the system is further configured to hold the second resource until the conditional event has been executed.

In yet another embodiment, the conditional event comprises a delivery of a good or service, and wherein the processing device is further configured to execute the computer-readable program code to: confirm the delivery of the good or service; and in response to confirming the delivery of the good or service, trigger the transfer of the resource.

In yet another embodiment, the conditional event further comprises scanning readable indicia associated with the resource transfer to trigger transfer of the resource.

A computer-implemented method for triggering peer-to-peer resource transfers with chained resource transfer events is also provided. The method comprising: generating a resource transfer for transferring a resource between one or more user devices, the resource transfer comprising a chain of conditional events for tracking the resource during the resource transfer, wherein the chain of conditional events comprises at least one triggering event for triggering a transfer of the resource, the at least one triggering event being dependent on an execution of the chain of conditional events; locking the chain of conditional events, wherein the chain of conditional events is accepted by the one or more user devices; determining that the at least one triggering event has been executed; and based on determining that the at least one triggering event has been executed, triggering the transfer of the resource.

In one embodiment, the method further comprises: determining that a conditional event of the chain of conditional events has been completed; and generating a record of the conditional event having been executed. In yet another embodiment, the method further comprises storing the record as a block stored on the chain of conditional events of the resource transfer, wherein the chain of conditional events provides a complete record of execution of the chain of conditional events.

In yet another embodiment, the chain of conditional events comprises a series of dependent events for triggering the transfer of the resource, wherein a failure to execute one of the series of dependent events cancels the resource transfer.

In yet another embodiment, the method further comprises holding the resource at a third party separate from the one or more user devices during the resource transfer.

In yet another embodiment, the method further comprises releasing the resource from the third party upon triggering the transfer of the resource.

A system for dynamic peer-to-peer resource transfers based on resource transfer exposure is also provided. The system comprising: a controller configured for generating customized resource transfers, the controller comprising a memory device with computer-readable program code stored thereon, a communication device connected to a network, and a processing device, wherein the processing device is configured to execute the computer-readable program code to: generate a resource transfer for transferring a resource between one or more user devices; calculate an exposure score for the resource transfer based on the resource and the one or more user devices; and based on the exposure score, generate a chain of conditional events for tracking the resource transfer, the chain of conditional events comprising a triggering event for triggering a transfer of the resource, wherein the chain of conditional events is accepted by the one or more user devices.

In one embodiment, the processing device is configured to execute the computer-readable program code to generate the triggering event in the chain of conditional events based on the exposure score.

In another embodiment, the processing device is configured to execute the computer-readable program code to recalculate the exposure score in real-time based on execution of an event in the chain of conditional events. In yet another embodiment, recalculating the exposure score comprises generating additional events in the chain of conditional prior to the triggering event or moving the triggering event further downstream in the chain of conditional events. In yet another embodiment, the processing device is configured to execute the computer-readable program code to cancel the resource transfer in response to the exposure score exceeding a predetermined threshold.

In yet another embodiment, the processing device is further configured to execute the computer-readable program code to calculate exposure scores for each of the events in the chain of conditional events.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
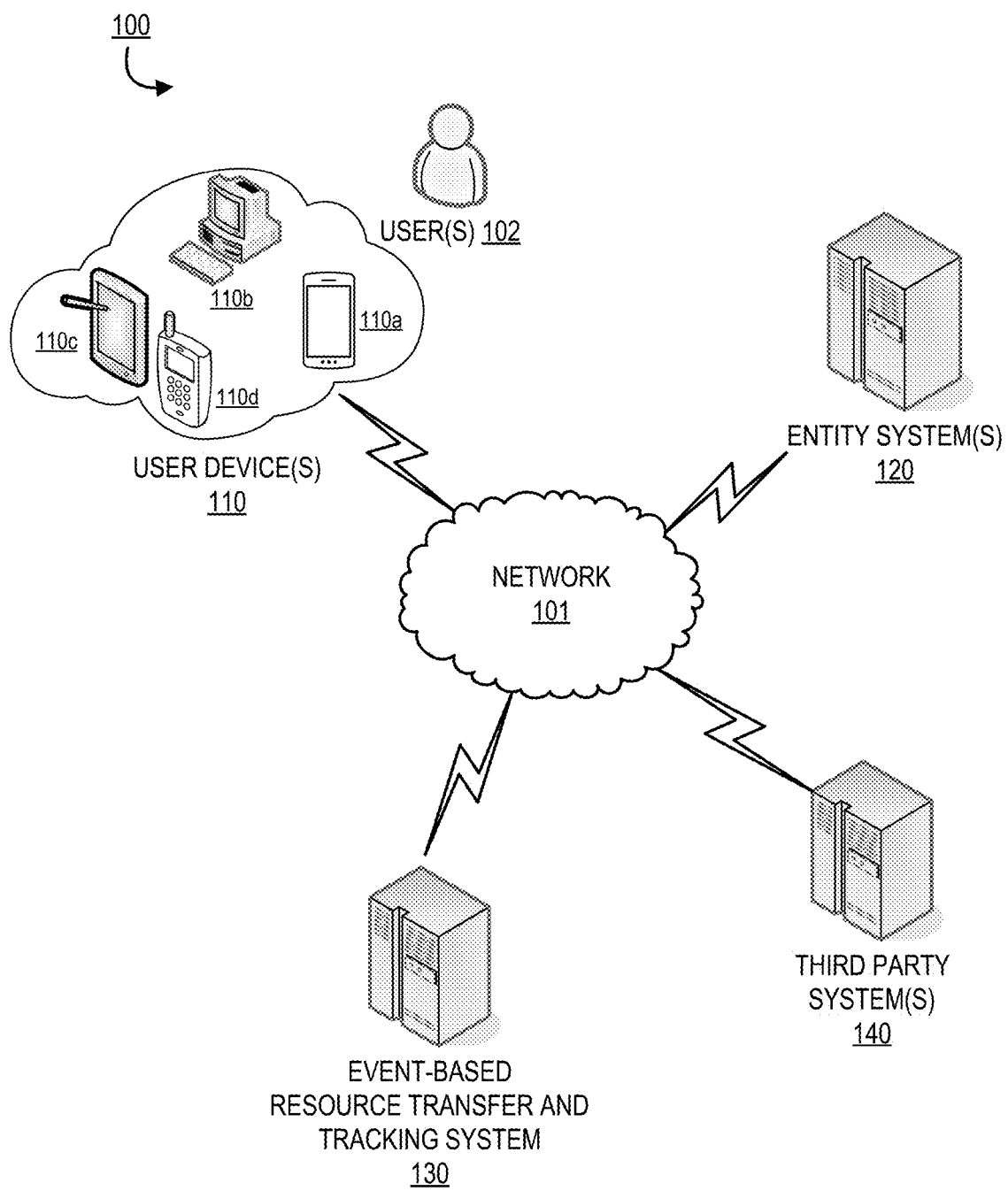
Figure 2:
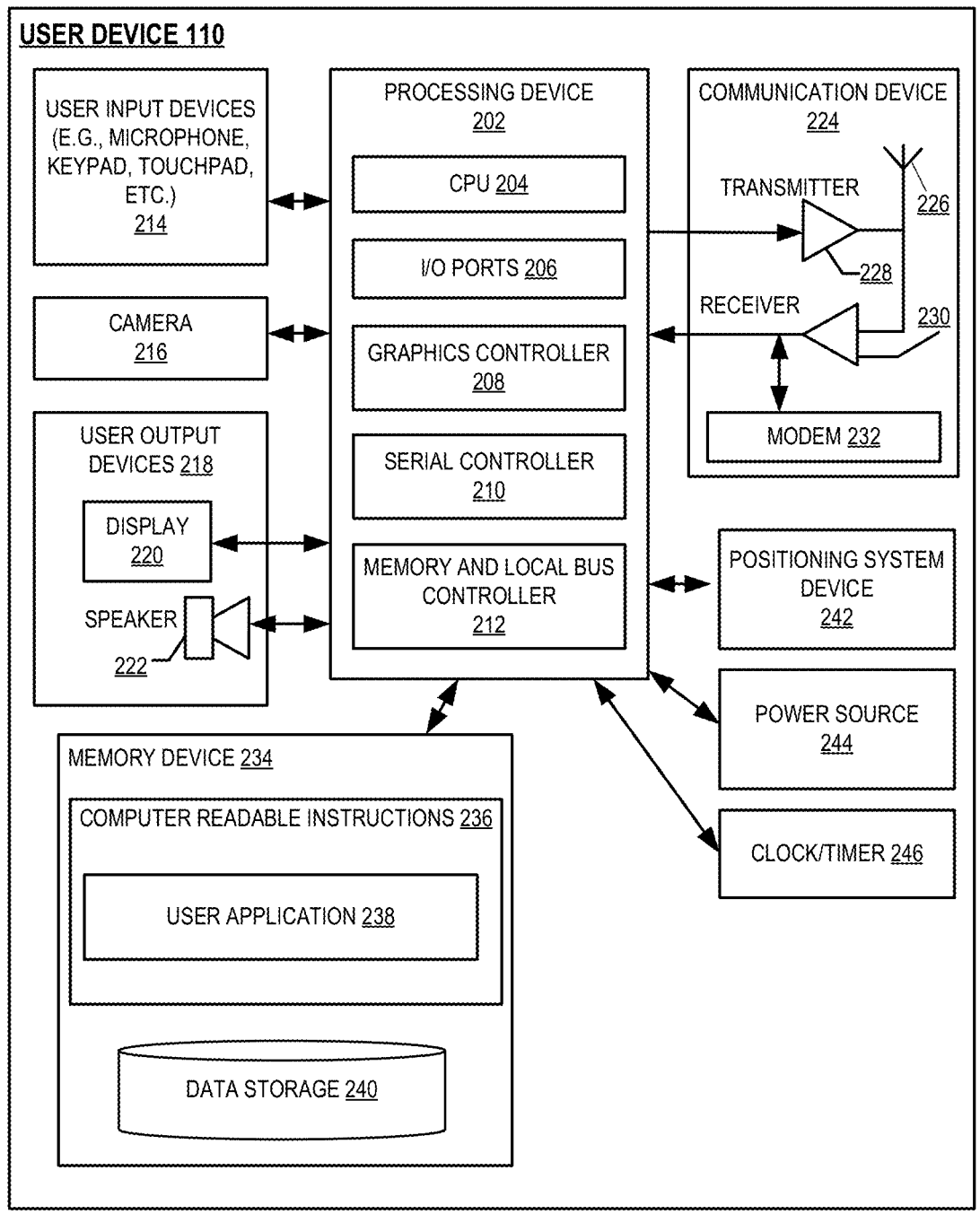
Figure 3:
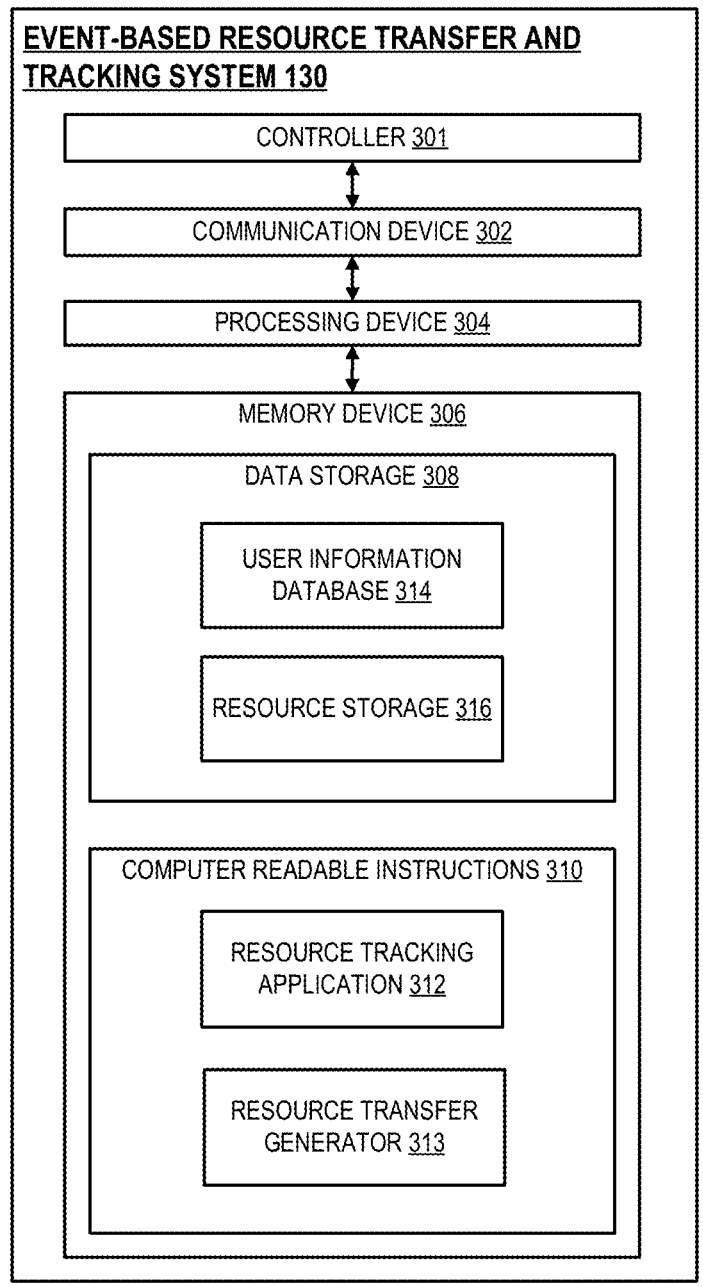
Figure 4:
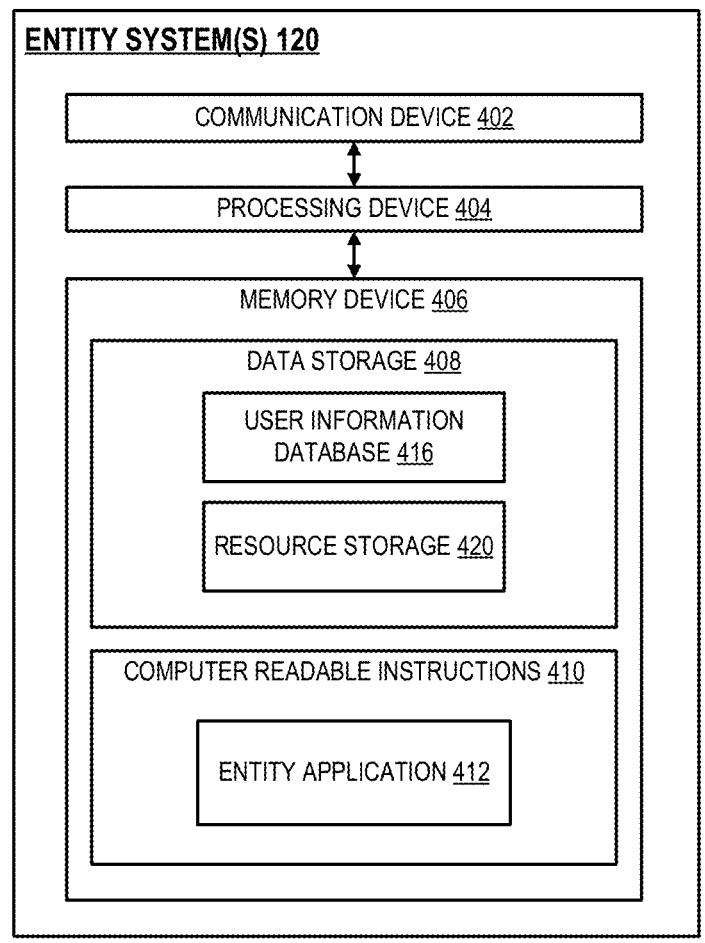
Figure 5:
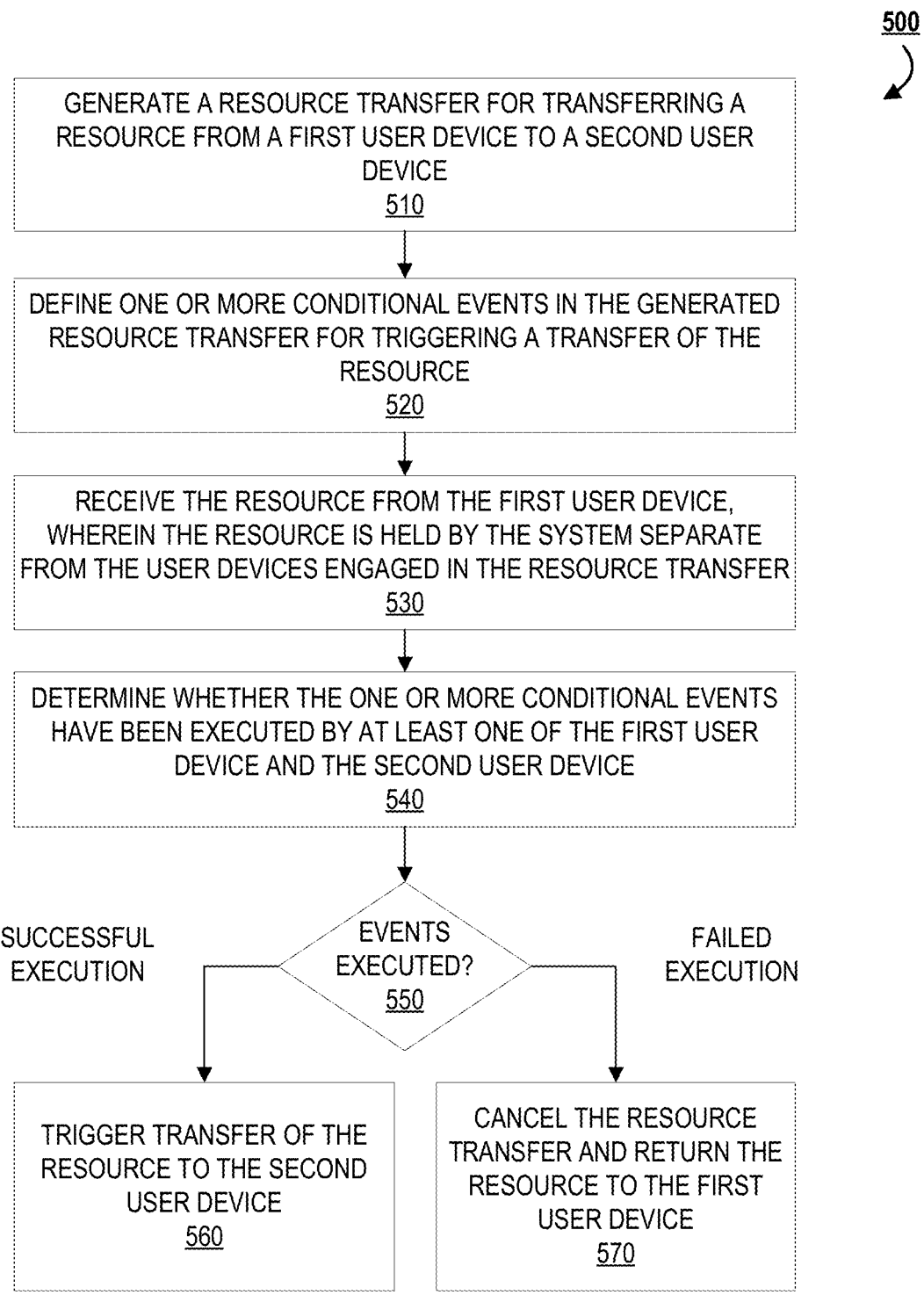
Figure 6:
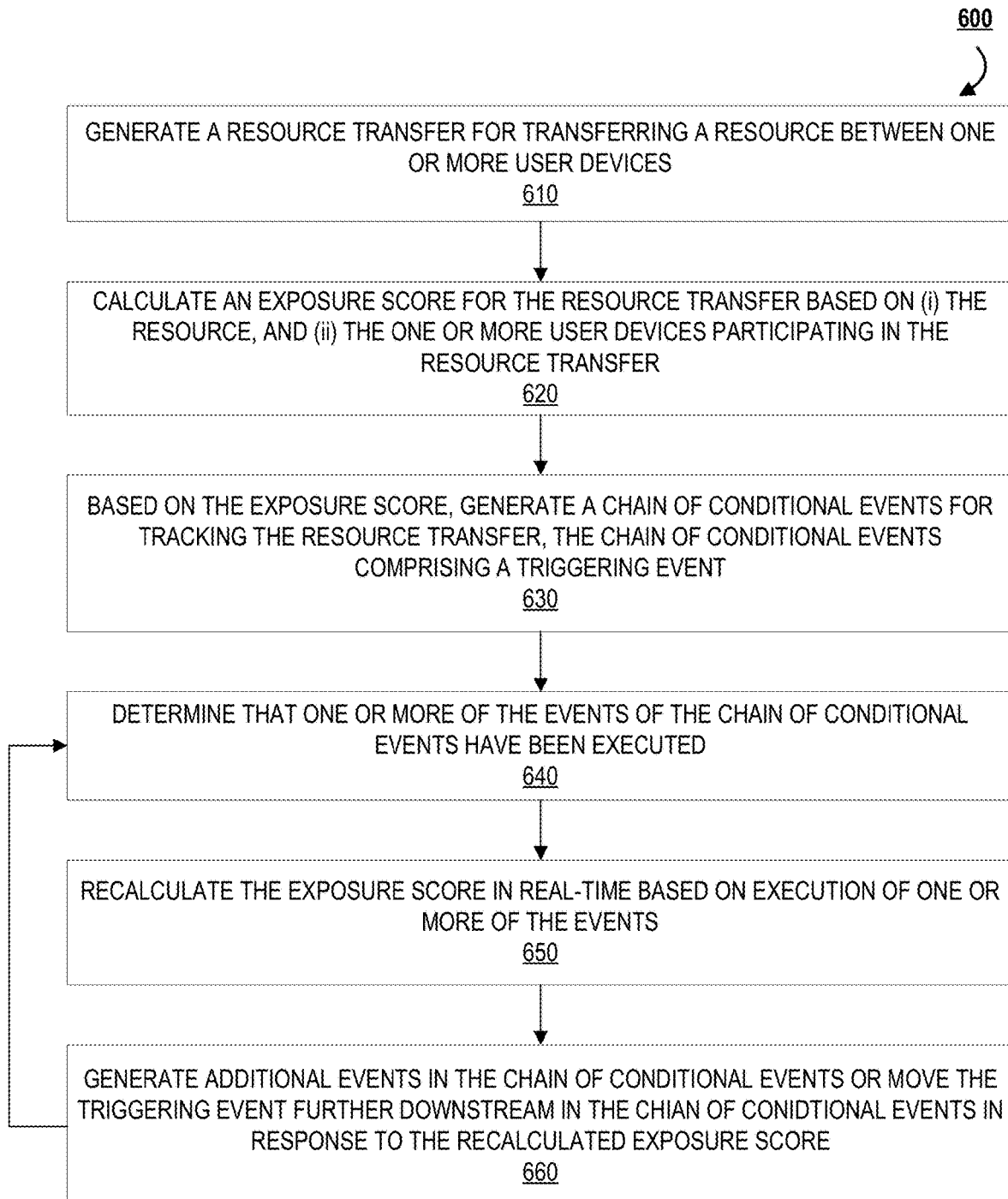

Having thus described embodiments of the invention in general terms, reference will now be made to the accompanying drawings, wherein:

FIG. 1 provides an event-based resource transfer and tracking environment, in accordance with one embodiment of the invention;

FIG. 2 provides a block diagram of a user device, in accordance with one embodiment of the invention;

FIG. 3 provides a block diagram of an event-based resource transfer and tracking system, in accordance with one embodiment of the invention;

FIG. 4 provides a block diagram of an entity system, in accordance with one embodiment of the invention;

FIG. 5 provides a high level process flow for event-based resource tracking during a resource transfer, in accordance with one embodiment of the invention; and FIG. 6 provides a high level process flow for generating resource transfers based on real-time exposure scoring, in accordance with one embodiment of the invention.

DETAILED DESCRIPTION OF EMBODIMENTS OF THE INVENTION

Embodiments of the invention, as described herein, leverage complex, specific-use computer system to provide a novel approach for generating and executing customizable resource transfers with event-based tracking for resource transfer security and delivery confirmation. The system of the present invention is configured to generate resource transfers between users and/or devices (e.g., a peer-to-peer interaction) and define one or more conditional events for triggering a transfer of resources, wherein the transfer is dependent upon successful execution of the one or more conditional events. The conditional events established in the resource transfer generated by the system are mutually agreed upon by all parties involved in the transfer before the transfer is initiated. In some embodiments, the system may generate a chain of conditional events comprising a series of dependent events that must be completed in order to successfully trigger a transfer of a resource and complete the resource transfer. These chains of events may be used to track the status of complex resource transfers and identify points of failure in the predefined terms. The system is further configured to cancel a resource transfer after determining a failure to successfully execute a condition event, wherein resources are released back to an original resource location (e.g., an originating user and/or user device). In contrast to the present invention, current peer-to-peer resource transfer methods lack reliable tools for tracking and confirming delivery of resources for both involved parties leading to the increased potential for exposure and misappropriation.

Embodiments of the invention may further include an exposure scoring component, wherein resource transfers generated by the system may be dynamically tailored based on the conditions of individual interactions. Defined conditions and triggering events for resource transfers may be defined or modified based on, for example, the type or amount of a resource to be transferred, the users and/or user devices participating in the transfer, or the like. For example, the system may be configured to position a triggering event further along a chain of conditional events based on high calculated exposure score.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "user" may refer to any entity or individual associated with the event-based resource transfer and tracking system described herein. In some embodiments, a user may be a computing device user, a phone user, a mobile device application user, a customer of an entity or business, a system operator, and/or employee of an entity (e.g., a financial institution). In one embodiment, a user may be a customer accessing a user account via an associated user device, wherein data from an interaction between the user and another user and/or entity is monitored, analyzed, and/or processed by the system. In a specific embodiment, a user is a requestor of an interaction or transaction with another user or entity, wherein the user is attempting to transfer or exchange resources with another user or entity. In some embodiments, identities of an individual may further include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, radio, global positioning system (GPS) devices, portable digital assistants (PDAs), pagers, mobile televisions, entertainment devices, automated teller machines (ATMs), or any combination of the aforementioned. The device may be used by the user to access the system directly or through an application, online portal, internet browser, virtual private network, or other connection channel.

As used herein, the term "entity" may be used to include any organization or collection of users that may interact with the event-based resource transfer and tracking system. An entity may refer to a business, company, or other organization that either maintains or operates the system or requests use and accesses the system. In some embodiments, an entity may refer to a financial entity. The terms "financial institution" and "financial entity" may be used to include any organization that processes financial transactions including, but not limited to, banks, credit unions, savings and loan associations, investment companies, stock brokerages, management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

As used herein, "authentication information" may refer to any information that can be used to authenticate an identify a user and/or a user device. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with a device and/or account) and determine that the user has authority to access an account or system or otherwise execute an interaction. In some embodiments, the system may be owned or operated by an entity. In such embodiments, the entity may employ additional computer systems, such as authentication servers, to validate and certify resources inputted by the plurality of users within the system.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, or data archive, wherein the system may be configured to reach out to the data source and watch, observe, or check the data source for changes, updates, variations, patterns, and the like. In other embodiments, a system may passively monitor a data source or data stream, wherein the data source or data stream provides information to the system and the system then watches, observes, or checks the provided information. In some embodiments, "monitoring" may further comprise analyzing or performing a process on something such as a data source or data stream either passively or in response to an action or change in the data source or data stream.

As used herein, an "interaction" may refer to any action or communication between one or more users, one or more entities or institutions, and/or one or more devices or systems within the system environment described herein. For example, an interaction may refer to a user interaction with a system or device, wherein the user interacts with the system or device in a particular way. In one embodiment, interactions may be received or extracted from a data stream (e.g., in real-time). An interaction may include user interactions with a user interface of a user application (e.g., clicking, swiping, text or data entry, etc.), authentication actions (e.g., signing-in, username and password entry, PIN entry, etc.), account actions or events (e.g., account access, fund transfers, document or record views, etc.) and the like. In another example, an interaction may refer to a user communication via one or more channels (i.e., phone, email, text, instant messaging, brick-and-mortar interaction, and the like) with an entity and/or entity system to complete an operation or perform an action with an account associated with user and/or the entity. In a specific embodiment, an interaction may comprise a transfer or exchange of resources (e.g., funds, data (i.e., files), goods, service, or the like) between users and/or devices either directly or via an intermediate system (e.g., an entity system and/or the event-based resource transfer and tracking system described below). In a specific embodiment, an interaction may comprise a peer-to-peer transfer or exchange of resources at least partially executed over a peer-to-peer network. In some embodiments, an interaction may comprise an exchange of resource and/or physical goods or services.

FIG. 1 provides an event-based resource transfer and tracking system environment 100, in accordance with one embodiment of the invention. As illustrated in FIG. 1, event-based resource transfer and tracking system 130 is operatively coupled, via a network 101, to the user device(s) 110 (e.g., a plurality of user devices 110*a*-110*d*) and the entity system(s) 120. In this way, the event-based resource transfer and tracking system 130 can send information to and receive information from the user device 110 and the entity system 120. In the illustrated embodiment, the plurality of user devices 110*a*-110*d* provide a plurality of communication channels through which the entity system 120 and/or the event-based resource transfer and tracking system 130 may communicate with the user 102 over the network 101.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101. The network 101 may further comprise a peer-to-peer communication network.

In some embodiments, the user 102 is an individual interacting with one or more entity systems 120 and/or other user devices via a user device 110 while a data stream or flow between the user device 110 and the entity system 120 and/or other user devices is intercepted and monitored by the event-based resource transfer and tracking system 130 over the network 101. In some embodiments a user 102 is a user requesting service from the entity or interacting with an account maintained by the entity system 120. In an alternative embodiment, the user 102 is an individual interacting with the event-based resource transfer and tracking system 130 over the network 101 and monitoring input of information from the entity systems 120 to and from the event-based resource transfer and tracking system 130 for processing and analysis (e.g., an employee of the entity operating and/or monitoring the systems 120, 130). In another specific embodiment, the user 102 in an individual interacting with another user to complete an interaction or transaction between the two users (e.g., a peer-to-peer interaction). For example, the interaction may be executed between user devices 110 of the two users directly. In an alternative example, the interaction may be processed through another system such as entity system 120 and/or event-based resource transfer and tracking system 130.

FIG. 2 provides a block diagram of a user device 110, in accordance with one embodiment of the invention. The user device 110 may generally include a processing device or processor 202 communicably coupled to devices such as, a memory device 234, user output devices 218 (e.g., a user display device 220, or a speaker 222), user input devices 214 (e.g., a microphone, keypad, touchpad, touch screen, and the like), a communication device or network interface device 224, a power source 244, a clock or other timer 246, a visual capture device such as a camera 216, a positioning system device 242, such as a geo-positioning system device or GPS device, an accelerometer, and the like. In one embodiment, the camera 216 may include a scanner, barcode reader, or any other image capturing device or sensor configured to capture an image or scan readable indicia (e.g., a barcode, label, or the like). The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120. In one embodiment, the user application 238 may be configured to allow a user 102 to request, initiate, and/or receive an interaction with another device or system. In some embodiments, the user application 238 is a resource transfer application, wherein the user application 238 is configured to allow a user to transfer, receive, or exchange, a resource with other user devices (e.g. via peer-to-peer interactions). In some embodiments, the memory device 234 may store information or data generated by the event-based resource transfer and tracking system 130 and/or by the processes described herein. In a specific embodiment, the memory device 234, and more specifically the data storage 240, may be configured to store a resource used in interactions described herein.

The processing device 202 may be configured to use the communication device 224 to communicate with one or more other devices on a network 101 such as, but not limited to the entity system 120 and the event-based resource transfer and tracking system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, and/or fourth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, the one or more applications 238, are loaded into the temporary memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

FIG. 3 provides a block diagram of an event-based resource transfer and tracking system 130, in accordance with one embodiment of the invention. The event-based resource transfer and tracking system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, and/or the event-based resource transfer and tracking system 130, in order to interface, monitor, and manage data flow between systems while executing commands to control the systems. In some embodiments, the controller 301 may be integrated into or be placed in one or more of the systems described herein. In other embodiments, the controller 301 may be a separate system or device. In some embodiments, the controller 301 may perform one or more of the processes, actions, or commands described herein.

As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the event-based resource transfer and tracking system 130 comprises computer-readable instructions 310 stored in the memory device 306, which in one embodiment includes the computer-readable instructions 310 of a resource tracking application 312 and a resource transfer generator 313. The resource transfer generator 313 may be configured to generate customized resource transfers between one or more user devices based on details of the transfer such as the resource associated with the transfer (e.g., type of resource, amount of the resource, etc.), the parties or users involved in the transfers, and a calculated exposure score associated with the transfer. The resource transfer generator 313 may be further configured to generate one or more conditional events to be executed by one or more of the users associated with the resource transfer in order to successfully trigger a transfer of the resource. In some embodiments, the resource transfer generator 313 may further include an exposure scoring module for calculating exposure scores associated with resource transfers and events. The resource tracking application 312 may be configured to track completion or execution of the one or more conditional events defined in a generated resource transfer to provide a record of a resource transfer progression and eventual successful delivery or failed execution by one or more of the involved parties. In some embodiments, the resource tracking application 312 may be configured to communicate with one or more third party systems or devices 140, as illustrated in FIG. 1, for tracking and confirming event execution. In one embodiment, the resource tracking application 312 may be configured to trigger a release of a held resource to one or more of the users involved in the resource transfer.

In some embodiments, the memory device 306 includes data storage 308 for storing data related to the system environment, but not limited to data created and/or used by the resource tracking application 312 and the resource transfer generator 313. Data stored in the data storage 308 may comprise a user information database 314 and a resource storage 316.

The user information database 314 is used to store information and data associated with one or more users and/or user devices as described herein. In some embodiments, the user information database 314 may include user identifying information, user account information, user interaction information (e.g., historical interactions, account actions or events, transactions, communications, inputs), user device information (e.g., device identification information, device serial numbers, digital signatures, device security tokens), exposure or misappropriation information, and the like. Resource storage 316 may include permanent or temporary storage for one or more resources associated with a resource transfer described herein, wherein the resource may be held separate from the users associated with the resource transfer.

In one embodiment of the invention, the event-based resource transfer and tracking system 130 may associate with applications having computer-executable program code that instruct the processing device 304 to perform certain functions described herein. In one embodiment, the computer-executable program code of an application associated with the user device 110 and/or the entity systems 120 may also instruct the processing device 304 to perform certain logic, data processing, and data storing functions of the application.

Embodiments of the event-based resource transfer and tracking system 130 may include multiple systems, servers, computers or the like maintained by one or many entities. In some embodiments, the event-based resource transfer and tracking system 130 may be part of the entity systems 120. In other embodiments, the entity systems 120 are distinct from the event-based resource transfer and tracking system 130. The event-based resource transfer and tracking system 130 may communicate with the entity systems 120 via a secure connection generated for secure encrypted communications between the two systems either over the network 101 or alternative to the network 101.

As illustrated in detail in FIG. 4, the environment 100 further includes one or more entity systems 120 which are connected to the user device 110 and the event-based resource transfer and tracking system 130. The entity systems 120 may be associated with one or more entities, institutions or the like. The entity systems 120 generally comprise a communication device 402, a processing device 404, and a memory device 406 further comprising data storage 408. The entity systems 120 comprise computer-readable instructions 410 stored in the memory device 406, which in one embodiment includes the computer-readable instructions of an entity application 412. The entity systems 120 may communicate with the user device 110 and the event-based resource transfer and tracking system 130 to provide access to accounts and resources stored and maintained on the entity systems 120. In some embodiments, the entity system 120 may communicate with the event-based resource transfer and tracking system 130 during a requested interaction or resource transfer between one or more users and/or user devices in real-time, wherein user interactions or resource transfers may be monitored and tracked by the event-based resource transfer and tracking system 130. In some embodiments, data storage 408 comprises user information database 416 and/or resource storage 420 to either supplement or replace similar data storages or databases on the event-based resource transfer and tracking system 130 as previously discussed.

The systems of the environment 100 may be used to generate and execute customizable resource transfers with event-based tracking for resource transfer security and delivery confirmation. As previously discussed, the system of the present invention is configured to generate resource transfers between users and/or devices (e.g., a peer-to-peer interaction) and define one or more conditional events for triggering a transfer of resources, wherein the transfer is dependent upon successful execution of the one or more conditional events. The conditional events established in the resource transfer generated by the system are mutually agreed upon by all parties involved in the transfer before the transfer is initiated. It should be understood that in some embodiments, the systems and methods described herein may operate as part of a peer-to-peer interaction performed between users and/or user devices, wherein the system and methods modify traditional peer-to-peer interactions to include enhanced resource tracking and improved interaction security.

FIG. 5 provides a high level process flow for event-based resource tracking during a resource transfer, in accordance with one embodiment of the invention. As illustrated in block 510 of FIG. 5, the system is configured to first generate a resource transfer. As used herein, a "resource transfer" may refer to any defined agreement between users for transferring or exchanging a resource along with any required conditions for permitting the transfer that have been mutually agreed upon by the users. A generated resource transfer may include all conditions and specifications of a requested transfer of resource between users. In some embodiments, a resource transfer may be an executable action generated by the system for performing a transfer or exchange of resource between users, wherein the devices of the users are controlled by the system to execute the transfer according to the agreed upon terms should the required conditions be successfully executed. The system is configured to receive the requested requirements form the users and generate the resource transfer for completing the requested interaction. Conditions or requirements associated with a resource transfer may includes a type of resource (e.g., funds, data, goods, services) to be transferred or exchanged, an amount of a resource to be transferred or exchanged, resource locations or destinations for resource delivery and origination (e.g., an account or the like), physical delivery locations for resources (e.g., user devices, network locations, GPS-determined locations), and the like.

In some embodiments, conditions defined in the resource transfer may further comprise one or more events, actions, or the like to be executed by one or more of the users to complete the resource transfer. As illustrated in block 520, the system defines one or more conditional events in the generated resource transfer, wherein triggering a transfer of resources is dependent on execution of at least one conditional event. Typically, the one or more conditional events include at least one triggering event for triggering the transfer of the resource. As the conditions defined in the resource transfer must be mutually agreed upon by all users involved in the transfer, the users must also agree on any conditional events and triggering events for triggering the transfer of resources.

In some embodiments, a generated resource transfer may comprise a chain of conditional event that includes a series of events dependent on one another, wherein a failure to execute one of the events along the chain may cause the system to cancel the associated resource transfer. For example, a chain of conditional events may comprise events A, B, C, D, and E, wherein the events are required to be executed in order, and wherein event E is a triggering event for triggering a transfer of a resource. In this example, if events A and B are successfully executed, but event C is failed, the system may be configured to cancel the resource transfer before the chain reaches triggering event E. In other embodiments, the system may be configured to generated custom resource transfers and chains of conditional events, wherein more than one event in a chain must be failed before a resource transfer is canceled.

In some embodiments, the system may be configured to lock a chain of conditional events after the conditions and terms of the resource transfer have been agreed upon or accepted by the users (i.e., via associated user devices) associated with the resource transfer. In this way, the system preserves the integrity of the mutually agreed upon conditions and prevents unauthorized modifications to the resource transfer after the process of the transfer has been initiated.

In some embodiments, a chain of conditional events generated by the system in a resource transfer may further comprise a block chain, wherein the events are stored as blocks or records generated by the system and placed on the block chain. For example, a resource transfer initially generated by the system may be added as an initial block, wherein one or more conditional events specified by the resource transfer may be added as additional blocks to the chain as the conditional events are completed or failed. In this way, the system may be further configured to provide a secure, complete record of events for tracking the progress of a resource transfer between users.

Non-limiting examples of conditional events and/or triggering events may include, receiving a message from one or more users or user devices (e.g., a delivery confirmation message), scanning of readable indicia (e.g., a barcode of a ticket, a tracking label of a package, etc.), capturing of an image (e.g. of a delivered package or good), determining a location of a device or resource (e.g., via GPS), or the like. In other examples, a conditional event and/or triggering event may be time-based, wherein an event is considered having been executed at a predetermined time or after a predetermined period of time has elapsed (e.g., 24 hours after the transfer was initiated, at the beginning of a play, movie, sporting event, etc.)

In order to ensure delivery of a resource and/or any other goods or services and prevent potential misappropriation, the system is configured to hold a resource to be transferred or exchanged during the resource transfer until the conditions of the resource transfer are fulfilled or terminated. As illustrated in block 530, the system is configured to receive a resource from a first user device, wherein the resource is held by the system separate from the user devices engaged in the resource transfer. In one embodiment, wherein the resource transfer is associated with a transfer of funds, the system may be configured to receive the temporarily hold the funds (e.g., in resource storage 316) until one or more conditional events are successfully executed or until the resource transfer is otherwise terminated. For example, a resource transfer between users may comprise a transfer of funds in exchange for goods. The system may be configured to impartially hold the funds on behalf of the users until any conditional events are successfully executed or the resource transfer is otherwise terminated.

In some embodiments, the system may further comprise a third party system or device configured to temporarily hold the resources associated with the resource transfer on behalf of the users, wherein the system is configured to trigger release of the resources from the third party in response to execution of the conditional events. In some embodiments, the third party system of device may be associated with an entity maintaining the system described herein. In other embodiments, the third party may be a separate entity contracted to hold and release the resource in response to execution of the conditions of a resource transfer generated by the system.

As illustrated in block 540, the system determines whether the one or more conditional events have been executed by at least one of the users and/or user devices associated with a generated resource transfer. In order to determine whether conditional events have been executed, the system may communicate with one or more additional systems to track the events. For example, the system may be configured to communicate with a package delivery tracking system to determine tracking and delivery status of a package. In other embodiments, the system may utilize an internal clock or timer for determining execution of time-based conditional events. In yet other embodiments, the system may rely on communication from one or more devices associated with a resource transfer for determining execution of one or more events, wherein the one or more devices transmit updates or event execution confirmation to the system. In one embodiment, the system may only consider an event successfully executed if all users involved in the resource transfer confirm or agree that the event was successfully executed. In some embodiments, the system may rely on communication with a third party intermediary system or device for impartial confirmation of event execution and/or resource delivery.

Based on determining successful completion of the one or more conditional events defined by the resource transfer at block 550, the system may proceed to block 560, wherein the system triggers the transfer of the resource based on the one or more conditional events having been successfully executed according to the conditions or criteria defined and mutually agreed upon in the resource transfer. In one embodiment, triggering transfer of the resource may comprise releasing the resource from a temporary hold by the system and/or a third party system or device to a recipient (e.g., a user resource location or user device) defined by the conditions and terms of the resource transfer. For example, in this way, a resource may be transferred from a first user device to a second user device.

Alternatively, as illustrated in block 570, if the one or more conditional have not been successfully executed or otherwise failed, the system may cancel the resource transfer. Upon cancellation, the system may be configured to automatically return any held resources back to a point of origination, such as a original user, user device, or resource location associated with the resource.

In some embodiments, the system may be further configured to dynamically configure customized resource transfers based on potential exposure or misappropriation. As such, FIG. 6 provides a high level process flow for generating resource transfers based on real-time exposure scoring, in accordance with one embodiment of the invention. As illustrated in block 610, and as previously discussed, the system is configured to generate a resource transfer for transferring a resource between one or more users and/or user devices.

In the illustrated embodiment of block 620 of FIG. 6, the system may be further configured to calculate an exposure score for the resource transfer. An exposure score, as calculated by the system, is a composite factor that may be input into the system to modify or enhance generated resource transfers. In some embodiments, calculation of the exposure score may be based on, for example, the resource itself (e.g. the type of resource, an amount of the resource, etc.) and/or the one or more users and associated devices participating in the resource transfer. For example, transfer of a larger amount of a resource or a transfer to an unknown user or stranger may factor into a higher calculated exposure score for a resource transfer.

As illustrated in block 630, the system is configured to generate one or more conditional events, such as a chain of conditional events, for tracking the resource transfer based on the exposure score. As previously discussed, the chain of conditional events includes at least one triggering event for triggering the transfer of the resource upon execution. Based on the calculated exposure score, the system may be configured to generate the conditional events and/or triggering events. For example, in response to a high exposure score, the system may be configured to generate additional events for triggering the transfer or tracking the progress of the transfer. In one embodiment, the system may be configured to place a triggering event in the chain of conditional events based on the exposure score. For example, for a resource transfer associated with a high exposure score, the system may place a triggering event further downstream in the chain of events to increase transfer security. In another embodiment, the system may be configured to add one or more additional or interconnected triggering events required for triggering transfer of the resource in response to a high exposure score. In yet another embodiment, one or more triggering events may be required to be executed simultaneously or within a predetermined time period to trigger the transfer. Alternatively, in response to lower exposure score (e.g., for a resource transfer for a small amount or with a familiar user), the system may remove one or more conditional events or otherwise simplify the resource to reduce an amount of computing resources used to process the transfer due to a high confidence in the transfer security.

In one embodiment, the system may be configured to calculate exposure scores for individual conditional events, such as events that are chained together. For example, a first event may be associated with higher potential for exposure than a second event. In this way, the system may identify one or more individual event that has a higher chance for potential misappropriation and increase security or require additional confirmation for the one or more individual events.

As previously discussed, the system is configured to determine that one or more of the events of the chain of conditional events have been executed and trigger transfer of the resource as illustrated in block 640. Alternatively, as illustrated in block 650, the system is configured to recalculate the exposure score in real-time based on execution of one or more of the conditional events executed before a final triggering event that releases the resource. In some embodiments, the system may recalculate an exposure score based on how a conditional event is executed. For example, a shipping event for a package may be executed and confirmed through a shipping entity scanning and receiving the package. The system may determine through the received scanning information that the package was shipped via a method that does not require a signature on delivery, does not include delivery insurance, does not include a tracking number, or the like. In response, the system may recalculate the exposure score for the resource transfer, wherein the exposure score may be modified (i.e., increased or decreased) based on the additional information.

In another embodiment, the system may recalculate an exposure score based on determined failure to execute one or more of the conditional events defined in the resource transfer. For example, the system may increase an exposure score based on a failed conditional event. For example, a failed conditional event may include a late or postponed shipment or delivery, a failure to provide a tracking number, a declined resource location (i.e., an account), or the like. In other embodiments, a failed conditional event, such as a triggering event, may instead automatically cancel the resource transfer.

As illustrated in block 660, in response to the recalculated exposure score, the system may be configured to generate additional events in a chain of conditional events or move the triggering event further downstream in the chain of conditional events in response to the recalculated exposure score. Following a recalculation and reconfiguration of the chain of conditional events, the system may proceed from block 660 to block 640 to continue with a resource transfer under the newly modified configuration. In one embodiment, the system may be configured to automatically cancel or terminate a resource transfer based on an exposure score exceeding a predetermined threshold.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of for generating and executing customizable resource transfers with event-based tracking for resource transfer security and delivery confirmation.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for generating and executing customizable resource transfers with event-based tracking for resource transfer security and delivery confirmation, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer-implemented method for triggering peer-to-peer resource transfers with chained resource transfer events, the method comprising:
   generating a peer-to-peer resource transfer for transferring a resource from a first user device to a second user device over a peer-to-peer network, the peer-to-peer resource transfer comprising a chain of conditional events, wherein the chain of conditional events comprises a chain of events stored and placed as blocks on a block chain, and wherein the events comprise a predetermined period of time having elapsed since acceptance of the peer-to-peer resource transfer without a tracking label of a package being scanned, the tracking label of the package being scanned, and a delivery confirmation message for the package being generated;
   receiving, from the first user device and the second user device, acceptance of the peer-to-peer resource transfer;
   receiving, after receiving the acceptance of the peer-to-peer resource transfer, the resource from the first user device over the peer-to-peer network;
   determining, after receiving the acceptance of the peer-to-peer resource transfer and based on a communication from a package delivery tracking system, whether the tracking label of the package has been scanned;
   determining, after receiving the acceptance of the peer-to-peer resource transfer, whether the predetermined period of time has elapsed since the acceptance of the peer-to-peer resource transfer without the tracking label of the package being scanned;
   cancelling, based on determining that the predetermined period of time has elapsed since acceptance of the peer-to-peer resource transfer without the tracking label of the package being scanned, the peer-to-peer resource transfer;
   returning, based on cancelling the peer-to-peer resource transfer, the resource to the first user device over the peer-to-peer network;
   determining, based on determining that the tracking label of the package has been scanned, based on determining that the period of time has not elapsed since the acceptance of the peer-to-peer resource transfer, and based on another communication from the package delivery tracking system, whether the delivery confirmation message for the package has been generated;
   generating, based on determining that the tracking label of the package has been scanned, a first record of the tracking label of the package having been scanned and storing the first record as a first block on the block chain;
   generating, based on determining that the tracking label of the package has been scanned and based on determining that the period of time has not elapsed since the acceptance of the peer-to-peer resource transfer, a second record and storing the second record as a second block on the block chain;
   generating, based on determining that the delivery confirmation message for the package has been generated, a third record and storing the third record as a third block on the block chain; and
   based on determining that the delivery confirmation message for the package has been generated, transferring the resource to the second user device over the peer-to-peer network.

2. The computer-implemented method of claim 1 further comprising holding the resource at a third party separate from the first user device and the second user device during the peer-to-peer resource transfer.

3. The computer-implemented method of claim 2, wherein transferring the resource to the second user device comprises releasing the resource from the third party.

4. The computer-implemented method of claim 1, comprising calculating an exposure score for the peer-to-peer resource transfer.

5. The computer-implemented method of claim 4, comprising recalculating the exposure score in real-time based on execution of the events.

6. The computer-implemented method of claim 5, comprising cancelling the peer-to-peer resource transfer in response to the exposure score exceeding a predetermined threshold.

7. The computer-implemented method of claim 1, comprising calculating an exposure score for each of the events.

8. A system for triggering peer-to-peer resource transfers with chained resource transfer events, the system comprising:
   a memory device with computer-readable program code stored thereon;
   a communication device connected to a network; and
   a processing device, wherein the processing device is configured to execute the computer-readable program code to:
   generate a peer-to-peer resource transfer for transferring a resource from a first user device to a second user device over a peer-to-peer network, the peer-to-peer resource transfer comprising a chain of conditional events, wherein the chain of conditional events comprises a chain of events stored and placed as blocks on a block chain, and wherein the events comprise a predetermined period of time having elapsed since acceptance of the peer-to-peer resource transfer without a tracking label of a package being scanned, the tracking label of the package being scanned, and a delivery confirmation message for the package being generated;
   receive, from the first user device and the second user device, acceptance of the peer-to-peer resource transfer;
   receive, after receiving the acceptance of the peer-to-peer resource transfer, the resource from the first user device over the peer-to-peer network;
   determine, after receiving the acceptance of the peer-to-peer resource transfer and based on a communication from a package delivery tracking system, whether the tracking label of the package has been scanned;
   determine, after receiving the acceptance of the peer-to-peer resource transfer, whether the predetermined period of time has elapsed since the acceptance of the peer-to-peer resource transfer without the tracking label of the package being scanned;

cancel, based on determining that the predetermined period of time has elapsed since acceptance of the peer-to-peer resource transfer without the tracking label of the package being scanned, the peer-to-peer resource transfer;

return, based on cancelling the peer-to-peer resource transfer, the resource to the first user device over the peer-to-peer network;

determine, based on determining that the tracking label of the package has been scanned, based on determining that the period of time has not elapsed since the acceptance of the peer-to-peer resource transfer, and based on another communication from the package delivery tracking system, whether the delivery confirmation message for the package has been generated;

generate, based on determining that the tracking label of the package has been scanned, a first record of the tracking label of the package having been scanned and storing the first record as a first block on the block chain;

generate, based on determining that the tracking label of the package has been scanned and based on determining that the period of time has not elapsed since the acceptance of the peer-to-peer resource transfer, a second record and storing the second record as a second block on the block chain;

generate, based on determining that the delivery confirmation message for the package has been generated, a third record and storing the third record as a third block on the block chain; and based on determining that the delivery confirmation message for the package has been generated, transfer the resource to the second user device over the peer-to-peer network.

9. The system of claim 8, wherein the processing device is configured to execute the computer-readable program code to hold the resource at a third party separate from the first user device and the second user device during the peer-to-peer resource transfer.

10. The system of claim 9, wherein transferring the resource to the second user device comprises releasing the resource from the third party.

11. The system of claim 8, wherein the processing device is configured to execute the computer-readable program code to calculate an exposure score for the peer-to-peer resource transfer.

12. The system of claim 11, wherein the processing device is configured to execute the computer-readable program code to recalculate the exposure score in real-time based on execution of the events.

13. The system of claim 12, wherein the processing device is configured to execute the computer-readable program code to cancel the peer-to-peer resource transfer in response to the exposure score exceeding a predetermined threshold.

14. The system of claim 8, wherein the processing device is configured to execute the computer-readable program code to calculate an exposure score for each of the events.

15. A computer program product for triggering peer-to-peer resource transfers with chained resource transfer events, the computer program product comprising a non-transitory computer-readable medium comprising code causing a first apparatus to:

generate a peer-to-peer resource transfer for transferring a resource from a first user device to a second user device over a peer-to-peer network, the peer-to-peer resource transfer comprising a chain of conditional events, wherein the chain of conditional events comprises a chain of events stored and placed as blocks on a block chain, and wherein the events comprise a predetermined period of time having elapsed since acceptance of the peer-to-peer resource transfer without a tracking label of a package being scanned, the tracking label of the package being scanned, and a delivery confirmation message for the package being generated;

receive, from the first user device and the second user device, acceptance of the peer-to-peer resource transfer;

receive, after receiving the acceptance of the peer-to-peer resource transfer, the resource from the first user device over the peer-to-peer network;

determine, after receiving the acceptance of the peer-to-peer resource transfer and based on a communication from a package delivery tracking system, whether the tracking label of the package has been scanned;

determine, after receiving the acceptance of the peer-to-peer resource transfer, whether the predetermined period of time has elapsed since the acceptance of the peer-to-peer resource transfer without the tracking label of the package being scanned;

cancel, based on determining that the predetermined period of time has elapsed since acceptance of the peer-to-peer resource transfer without the tracking label of the package being scanned, the peer-to-peer resource transfer;

return, based on cancelling the peer-to-peer resource transfer, the resource to the first user device over the peer-to-peer network;

determine, based on determining that the tracking label of the package has been scanned, based on determining that the period of time has not elapsed since the acceptance of the peer-to-peer resource transfer, and based on another communication from the package delivery tracking system, whether the delivery confirmation message for the package has been generated;

generate, based on determining that the tracking label of the package has been scanned, a first record of the tracking label of the package having been scanned and storing the first record as a first block on the block chain;

generate, based on determining that the tracking label of the package has been scanned and based on determining that the period of time has not elapsed since the acceptance of the peer-to-peer resource transfer, a second record and storing the second record as a second block on the block chain;

generate, based on determining that the delivery confirmation message for the package has been generated, a third record and storing the third record as a third block on the block chain; and based on determining that the delivery confirmation message for the package has been generated, transfer the resource to the second user device over the peer-to-peer network.

16. The computer program product of claim 15, wherein the non-transitory computer-readable medium comprises code causing the first apparatus to hold the resource at a third party separate from the first user device and the second user device during the peer-to-peer resource transfer.

17. The computer program product of claim 16, wherein transferring the resource to the second user device comprises releasing the resource from the third party.

18. The computer program product of claim 15, wherein the non-transitory computer-readable medium comprises code causing the first apparatus to calculate an exposure score for the peer-to-peer resource transfer.

19. The computer program product of claim 18, wherein the non-transitory computer-readable medium comprises code causing the first apparatus to recalculate the exposure score in real-time based on execution of the events.

20. The computer program product of claim 19, wherein the non-transitory computer-readable medium comprises code causing the first apparatus to cancel the peer-to-peer resource transfer in response to the exposure score exceeding a predetermined threshold.

\* \* \* \* \*